A. D. PUFFER.
Making Soda-Water Fountains.

No. 167,688.  Patented Sept. 14, 1875.

Witnesses.  A. D. Puffer.
F. Hunnewell  F. Curtis. Atty.
W. E. Boardman

UNITED STATES PATENT OFFICE.

ALVIN D. PUFFER, OF BOSTON, MASSACHUSETTS.

IMPROVEMENT IN MAKING SODA-WATER FOUNTAINS.

Specification forming part of Letters Patent No. 167,688, dated September 14, 1875; application filed May 24, 1875.

*To all whom it may concern:*

Be it known that I, ALVIN D. PUFFER, of Boston, Suffolk county, Massachusetts, have invented certain Improvements in Manufacture of Soda-Water Fountains, of which the following is a specification:

This invention relates to means for preventing fusion of the inner casing or lining of a soda-fountain while the seams of the outer shell or jacket thereof are being soldered or brazed; and consists in imparting temporarily, at the desired point to the inner casing, such a form that a considerable space exists at this point between its circumference and the seam of the outer shell to be closed, thereby insulating and protecting it against the heat which the act of closing the seam genders, and afterward, by steam or other pressure, restoring the said lining to its original cylindrical form and primitive size, whereby space between the two vessels is closed, with the exception of a small amount of air-space. To allow escape of the air from the space between the two vessels, I perforate the outer shell, and afterward close the same by solder or a screw.

I prefer to drill this hole through the base of one of the handles of the fountain, in order that, when this hole is subsequently soldered up, the thickness of metal at this point is sufficient to protect the inner vessel from injury by the heat from the soldering process.

Figure 1:
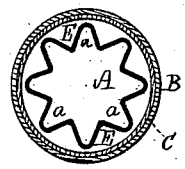
Figure 2:
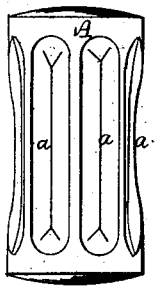
Figure 3:
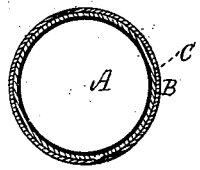

The drawings accompanying this specification represent, in Figure 1, a horizontal section of a soda-fountain, and in Fig. 2 a side elevation of its inner lining, as showing one step in the process of manufacture as contemplated by my invention. Fig. 3 is a section of the completed fountain.

In these drawings, A represents the inner case or lining of a soda-fountain, which is usually composed of block-tin, and B the outer jacket or shell of copper, iron, or other material, which receives it, the latter being formed in two halves united by a lap-joint, C, at about the center, though this joint may be at some other locality, as at the head, for instance, or the jacket B may be formed of several parts, which would necessitate several joints.

In carrying out my invention, I first provide the lining or inner vessel A after the usual manner, and of the ordinary size and form. I then reduce the outside bulk or diameter of this vessel A at a point immediately opposite or adjacent to the seam C of the outer case, by a series of depressions or corrugations, *a a*, &c., or by any conformation by which its periphery is caused to recede temporarily from the outer shell, and produce an intervening air-space, F, which is a non-conductor of heat, and will protect the vessel A from injury when the said joint C is being closed. I then inclose the vessel A in the outer shell B, and solder or braze the joint C of the latter, the air-space E intervening between the two, effectually preventing heat resulting from this operation from injuriously affecting the said vessel A. I next admit to the interior of the vessel A, through the hole which receives the discharge-pipe, a quantity of air, steam, or other fluid under pressure, which serves to restore the periphery of the said vessel to its original cylindrical form, and fill up the space E intervening between the two vessels. The discharge-pipe is now added, and the fountain is complete.

Several methods have heretofore been adopted for protecting the inner vessel while closing the seam of the outer, all of which are attended with more or less objections. One has been to enwrap the inner vessel in paper, which is a good non-conductor of heat, while another has been to admit a quantity of water within the inner vessel for a like purpose.

By my method I not only effectually protect the inner vessel from effects of heat, but I obtain, as a final result, a close joint between the two throughout.

Although I have, in the present instance, shown the joint between the two portions of the jacket B as a peripherical one, and the corrugations as formed in the periphery of the inner vessel, I do not confine myself to any locality in this respect, as this lessening of the exterior surface of the said inner vessel may be effected at any desired point to conform to the joint or joints in the outer case whereon the latter may occur.

I claim—

The herein-described manufacture of soda-fountains, consisting, first, in reducing the diameter or exterior bulk of the inner vessel to obtain an air-space; second, in soldering or brazing the seams of the outer vessel or shell; and, thirdly, in restoring the inner vessel, by suitable internal pressure, to its primitive form, essentially as and for the purposes stated.

A. D. PUFFER.

Witnesses:
F. CURTIS,
W. E. BOARDMAN.